United States Patent
Engel et al.

(10) Patent No.: US 10,049,491 B1
(45) Date of Patent: Aug. 14, 2018

(54) DYNAMIC GLOBAL ILLUMINATION SYSTEM

(71) Applicant: Confetti Interactive Inc., Encinitas, CA (US)

(72) Inventors: Wolfgang Engel, Carlsbad, CA (US); Igor Lobanchikov, Minsk (BY); Timothy Martin, San Diego, CA (US)

(73) Assignee: CONFETTI INTERACTIVE INC., Encinitas, CA (US)

( * ) Notice: Subject to any disclaimer, the term of this patent is extended or adjusted under 35 U.S.C. 154(b) by 372 days.

(21) Appl. No.: 14/030,612

(22) Filed: Sep. 18, 2013

Related U.S. Application Data

(60) Provisional application No. 61/702,604, filed on Sep. 18, 2012.

(51) Int. Cl.
*G06T 15/80* (2011.01)

(52) U.S. Cl.
CPC .................. *G06T 15/80* (2013.01)

(58) Field of Classification Search
CPC ....... G06T 17/005; G06T 13/20; G06T 15/00; G06T 15/80
See application file for complete search history.

(56) References Cited

U.S. PATENT DOCUMENTS

| | | | | |
|---|---|---|---|---|
| 2008/0033696 | A1* | 2/2008 | Aguaviva | G06F 11/3423 702/186 |
| 2011/0012901 | A1* | 1/2011 | Kaplanyan | G06T 15/506 345/426 |
| 2015/0235410 | A1* | 8/2015 | Ha | G06T 15/60 345/426 |

OTHER PUBLICATIONS

Kaplanyan, Anton, and Dachsbacher, Carsten, "Cascaded Light Propagation Volumes For Real-Time Indirect Illumination." Proceedings of the 2010 ACM SIGGRAPH Symposium on Interactive 3D Graphics and Games. ACM, 2010.*

Luft, Thomas, and Oliver Deussen, "Real-Time Watercolor Illustrations of Plants Using a Blurred Depth Test," Proceedings of the 4th International Symposium on Non-Photorealistic Animation and Rendering. ACM, 2006.*

Wikiepdia, Octree, as appearing on Jun. 25, 2012, at https://en.wikipedia.org/w/index.php?title=Octree&oldid=499292252.*

* cited by examiner

*Primary Examiner* — Kumar Patel
*Assistant Examiner* — Richard M Russell
(74) *Attorney, Agent, or Firm* — Gavrilovich, Dodd & Lindsey LLP

(57) ABSTRACT

This disclosure provides for a Dynamic Global Illumination system which is capable of mimicking in electronic visual media the properties of light in reality.

19 Claims, 8 Drawing Sheets

A
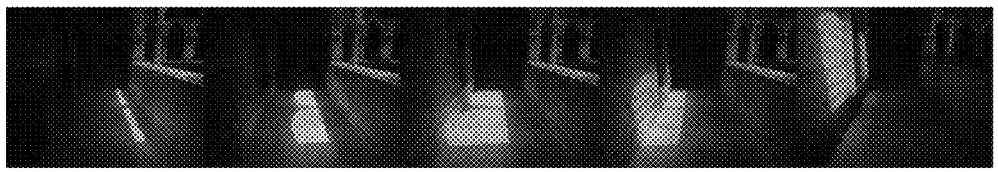
B
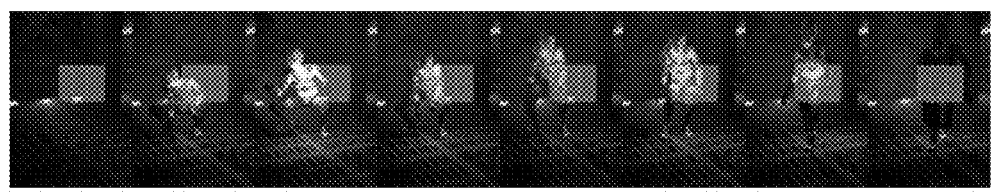
C
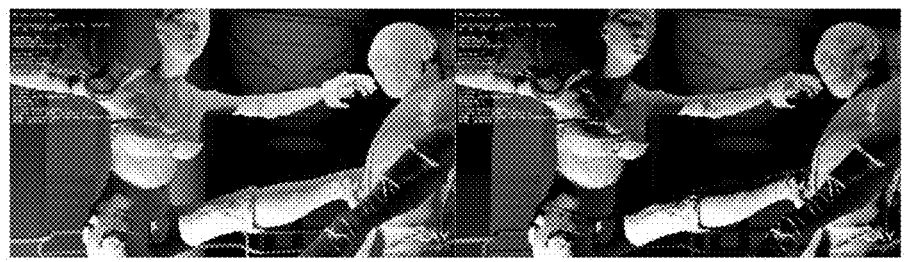
FIGURE 1A-C

DYNAMIC GLOBAL ILLUMINATION SYSTEM

CROSS REFERENCE TO RELATED APPLICATIONS

This application claims priority under 35 U.S.C. § 119 to U.S. Provisional Application Ser. No. 61/702,604, filed on Sep. 18, 2012, the disclosure of which is incorporated herein by reference in its entirety.

FIELD OF THE INVENTION

This invention relates to a system of generating dynamic lighting effects for electronic visual media.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Developments in dynamic lighting effects for electronic visual media have had a profound impact on many types of media and have revolutionized animation, movies and the video game industry.

SUMMARY

This disclosure provides for a Dynamic Global Illumination ("DGI") system for electronic visual media. The dynamic global illumination system disclosed herein is capable of representing in an electronic visual media, such as computer generated imagery, the properties of light in reality. In a particular embodiment, the dynamic global illumination system disclosed herein can represent in electronic visual media the properties of light bouncing off an object. In a further embodiment, the dynamic global illumination system disclosed herein can represent in electronic visual media a change in spectral properties between the incident and reflective light such as when incident light interacts with the material or color of an object. In yet a further embodiment, the dynamic global illumination system disclosed herein can represent in electronic visual media the change in spectral properties between incident and reflective light by illuminating a second object with the reflective light. For example, the dynamic global illumination system disclosed herein can represent that the reflective light spectral properties have changed by interacting with the color of the first object by illuminating the second object with a similar hue as the first object.

The dynamic global illumination system of the disclosure can represent in electronic visual media the properties of multiple sources of light bouncing off one or more objects.

The dynamic global illumination system can represent in electronic visual media diffuse and specular light contributions from multiple rays of light at the same time.

The disclosure provides for a Dynamic Global Illumination ("DGI") system for electronic visual media comprising the data flow of: (A) capturing light data in cube reflective shadow maps ("CRSMs"); (B) injecting the light and occlusion data into one or more Light Propagation Volumes ("LPVs"); (C) propagating the light and occlusion data in the one or more LPVs; (D) applying the global illumination data from the one or more LPVs to a scene; and (E) outputting the scene to electronic visual media. In one embodiment, for step (A) a fall-off function is used to adjust the light data captured in the cube reflective shadow map. In another embodiment, for step (A) the CRSM size is picked dynamically based upon whether there is a dynamic object in the area of influence of the light source, wherein a dynamic object that is closer to the light source will be rendered into a higher resolution CRSM while if there is no dynamic object in the area of influence of the light source then a lower resolution CRSM is used. In yet a further embodiment, the CRSMs may be cached for those CRSMs that have no dynamic object in the area of influence of the light source. In another embodiment, for step (B), the light data from the CRSM is calculated as reflected flux and then compressed as two bands of the spherical harmonics basis and injected into the VPL, wherein the two bands of the spherical harmonics basis use four coefficients for each of the red, blue and green color channels, so that three volume textures are stored for red, green, and blue color channels. In a particular embodiment, for step (B) an LPV octree is implemented so as to partition a three dimensional space by either assigning a leaf with as much SH information as desired or by recursively subdividing it into eight spatial octants. In a further embodiment, the LPV octree is generated by first building a full voxel array on the graphics processor unit ("GPU"), and then building a similarity volume so as to create cells at each node. In yet a further embodiment, the light propagation phase for the LPV octree utilizes a non-subdividing operation for each leaf node and/or a basic subdividing operation for each propagation step. In yet another embodiment, for step (B) a cascade of LPVs is used, and when a grid cell location is being calculated it is binned into one of the cascaded LPVs so that data is not replicated across separate cascades. In one embodiment, for step (B) the occlusion data are represented by volumetric grid structures in geometry volumes ("GVs"), wherein each grid cell contains a set of four spherical harmonic coefficients which describe the influence on occlusion at that location. In a further embodiment, the GVs are offset by half a cell's length in every direction so each of the grid cell's lie in the GV lie on the corners of the grid cells in the LPV, so that when propagating light in the LPV, the occlusion data will come from the GV grid cells that lie between the cells in the LPV that light is propagating through. In one embodiment, flickering can be reduced by: (A) capturing the light data as two CRSM copies, an old copy and a current copy; and (B) injecting the light data from both of the CRSM copies into the one or more LPVs, wherein the old copy has a 1-dt coefficient and the current copy has a dt coefficient, such that a linear interpolation between both CRSM copies is effectively used. In another embodiment, if a light makes two or more bounces than each bounce is injected into a separate LPV, so that there are two or more sets of 3 volume textures for two or more bounces. In yet another embodiment, for step (C) the light and occlusion data in the one or more LPVs is propagated in one virtual direction from at least six neighboring cells to the center destination cell. In a certain embodiment, the light and occlusion data in the one or more LPVs is propagated from twenty six immediately adjacent neighboring cells that share a face, edge and/or corner. In a further embodiment, up to a total of 9 coefficients per color channel can be used, which results from an extra order of spherical harmonics ("SH"). In one embodiment, prior to step (D) a dampening factor is used to eliminate artifacts prior to applying the light to the scene comprising the steps of: projecting the gradient vector on the light flow direction vector; and applying a smoothstep function to the results of the projection to generate the dampening factor. In another embodiment, a glossy specular reflection can be applied to the scene by fetching the value of the SH function for the r direction, so that the specular coefficient is applied as a simple scalar multiplier. In any of the foregoing embodiments, one or more central processing units and/or graphics accelerators of a computer system process the data flow of the DGI system, and wherein the scene is presented to one or more subjects using electronic visual media.

The disclosure also provides a computer readable medium containing program instructions for providing dynamic global illumination effects in electronic visual media, wherein execution of the program instructions by one or more processors of a computer system causes the one or more processors to carry out the steps of: (A) capturing light data in CRSMs; (B) injecting the light and occlusion data into one or more LPVs; (C) propagating the light and occlusion data in the one or more LPVs; and (D) applying the global illumination data from the one or more LPVs to a scene.

DESCRIPTION OF DRAWINGS

FIG. 1A-C provides various illumination effects provided by a dynamic global illumination system of the disclosure: (A) shows from left to right: an illumination effect of capturing the movement of a sun traveling across a sky by representing a concentrated beam of light on a floor through an arch, wherein the light is partially reflected on the immediate surrounding representative surfaces, the light beam is then represented as expanding until reaching a wall where the light is then represented as reflecting from the floor to the wall, and then finally representing the light beam traveling up the wall; (B) from left to right: an illumination effect of a concentrated light beam reflecting off a surface and hitting a figure where the figure first moves closer to source of reflected light then moves away from the source of reflected light; and (C) left panel: an illumination effect of incident light hitting a figure, on the right, who is wearing a red overall, and then representing the light that is reflected as having different spectral properties on surrounding surfaces and on the figure on the left, as a having a reddish hue; and right panel: shows a lack of an illumination effect once the dynamic global illumination system of the disclosure is switched off.

DETAILED DESCRIPTION

As used herein and in the appended claims, the singular forms "a," "and," and "the" include plural referents unless the context clearly dictates otherwise. Thus, for example, reference to "a cube reflective shadow map" includes a plurality of such maps and reference to "the light data" includes reference to one or more data that can represent light properties in electronic visual media known to those skilled in the art, and so forth.

Also, the use of "or" means "and/or" unless stated otherwise. Similarly, "comprise," "comprises," "comprising" "include," "includes," and "including," and "have," "haves," and "having," are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

All publications mentioned throughout the disclosure are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure. Moreover, with respect to similar or identical terms found in the incorporated references and terms expressly defined in this disclosure, the term definitions provided in this disclosure will control in all respects.

The term "subject" as used herein refers to living organisms capable of viewing images presented in electronic visual media.

The term "dynamic" as used herein with respect to an illumination system refers to an illumination system able to generate all necessary data in real-time and during run-time without requiring to build data prior to the representation of an illumination effect.

Figure 2:
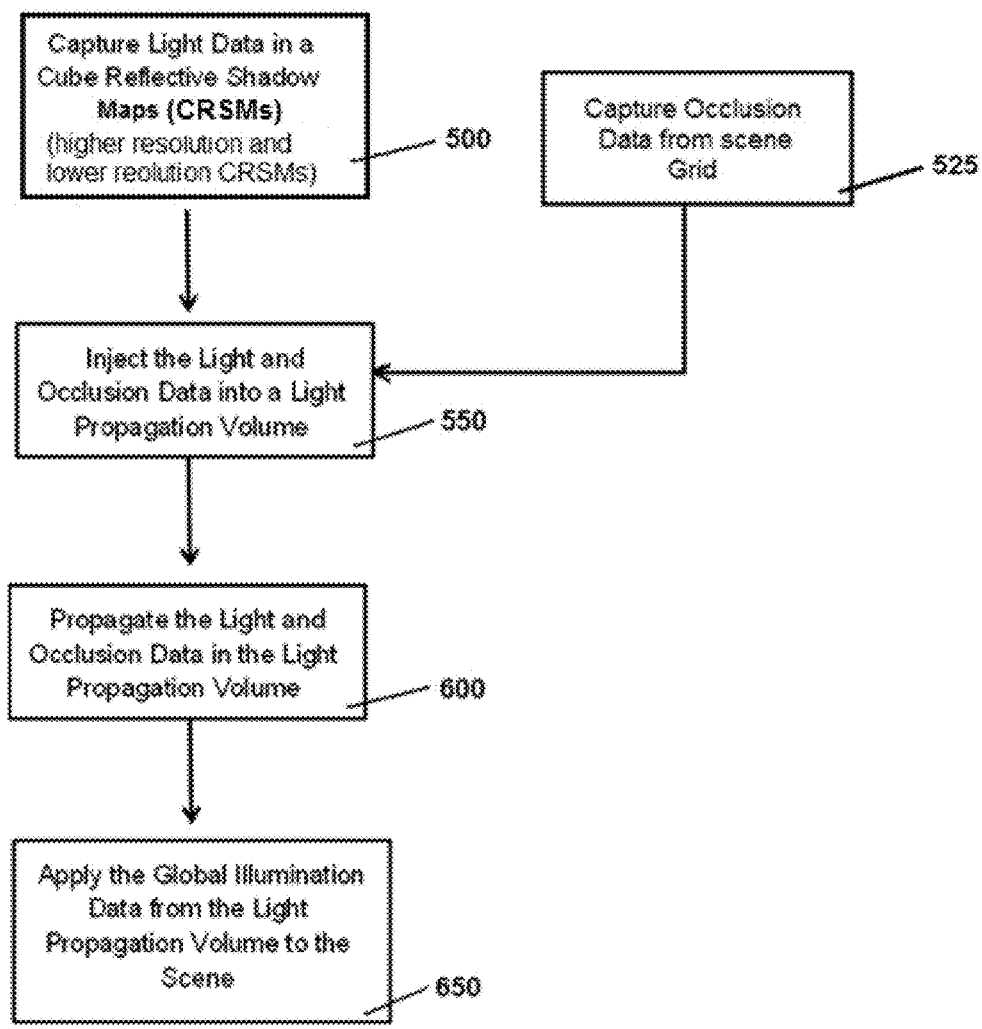
FIG. 2 presents a flow chart of the Dynamic Global Illumination System of the disclosure.

FIG. 2 illustrates a data flow for the Dynamic Global Illumination ("DGI") system of the disclosure. The overall process includes the capture of light data in a Cube Reflective Shadow Map ("CRSM") 500, and obtaining occlusion data from volumetric grid structures in a scene 525 and injecting the light and occlusion data into a Light Propagation Volume ("LPV") 550, propagate the light and occlusion data in the Light Propagation Volume 600, and apply the global illumination data from the Light Propagation Volume to a Scene 650.

In one embodiment, the DGI system of the disclosure treats each pixel in the Cube Reflective Shadow Map as a light source, a Virtual Point Light ("VPL"), by storing depth, normal and flux data. The normal represents the flux direction of the light source. Moreover, a cube map implementation is generally equivalent to the use of six spot lights. Accordingly, in a further embodiment, the DGI system of the disclosure is equally applicable to spot light(s) and the same processes and data flow can similarly be utilized.

Figure 3:
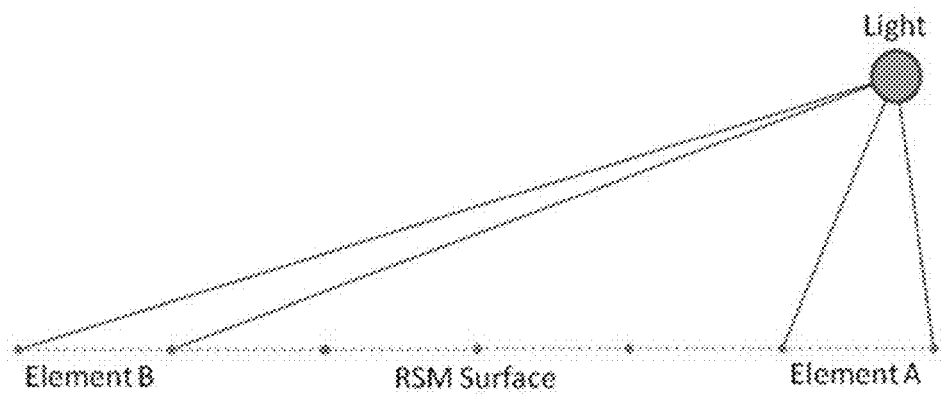
FIG. 3 demonstrates that a solid angle projection is not uniform across a Cube Reflective Shadow Map ("CRSM").

One of the challenges associated with the projection and rendering of the flux data onto a Cube Reflective Shadow Map was that the solid angle of projection is not uniform across the CRSM (see e.g., FIG. 3).

Figure 4:
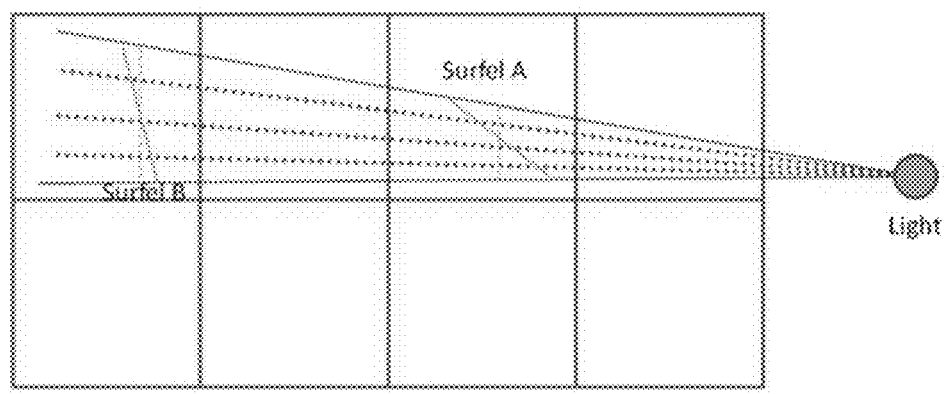
FIG. 4 demonstrates that the flux amount per surfel depends only on the solid angle projection. As indicated, the same amount of photons (dotted lines) will pass through surfel A compared to surfel B for every CRSM texel.

A further challenge is the fact that the flux amount per surfel (surface pixel) depends only on the solid angle, not the surface orientation or distance from the light source (see e.g., FIG. 4). Moreover, a surfel with increasing distance can become bigger than the LPV cell in which the data is being stored in, and further, the surfel might be far outside the area of the influence of the light source.

Figure 5:
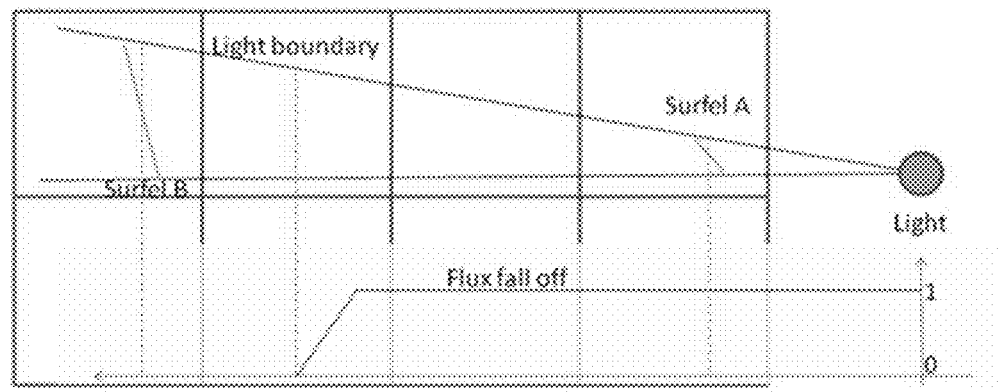
FIG. 5 demonstrates application of a fall-off function to avoid adding surfels to the Light Propagation Volume ("LPV") that are bigger than the cell, and establishing a light boundary.

In a particular embodiment, the DGI system of the disclosure overcomes these challenges by comprising a fall-off function (see e.g., FIG. 5). The fall-off function is a smooth-step function, which utilizes Hermite interpolation to step between two values.

Figure 6:
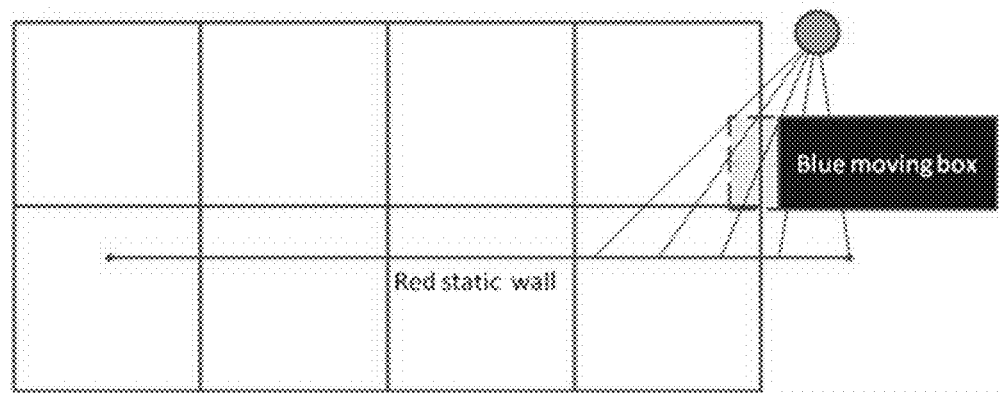
FIG. 6 demonstrates the effect of a dynamic moving object, indicated as "Blue Moving Box," moving in front of a background, indicated as "Red Static wall," on the solid angle projection, where the change in surface color and position that results from the dynamic moving object occludes the background. The white cubic cells represent a single layer of stack of the Light Propagation Volume and the black rays represent the boundaries of a single pixel in the CRSM.

A problem associated with capturing light data in CRSM maps is that it is harder to capture data for dynamic objects due to occluding effects. Because the cells of the Light Propagation Volume (LPV) are relatively big compared to the moving object, the change in surface color and position that results from a dynamic object moving and occluding a background might be abrupt (see e.g., FIG. 6). In other words the flux change in the grid might lead to popping. In a certain embodiment, the DGI system of the disclosure renders a dynamic object that is closer to the light source in a higher resolution cube map, wherein the CRSM size is picked dynamically based on the condition if there is a dynamic object in the area of influence of the light source with the attached cube reflective shadow map. For purposes of this disclosure, CRSMs that account for dynamic objects are called "dynamic cube reflective shadow maps" or "dynamic CRSMs." By contrast, for purposes of this disclosure, CRSMs that do not have to account for dynamic objects or have static geometries in the area of influence of a light source are called "static cube reflective shadow maps" or "static CRSMs". Furthermore, for purposes of this disclosure "cube reflective shadow maps" or "CRSM" refers to both dynamic CRSMs and to static CRSMs, unless provided for otherwise.

In a particular embodiment, the DGI system of the disclosure may cache static CRSMs, such that the static CRSMs are not updated as long as there is no dynamic object in the area of influence of the light source. By caching static CRSMs, the rendering time for a scene is significantly decreased.

Figure 7:
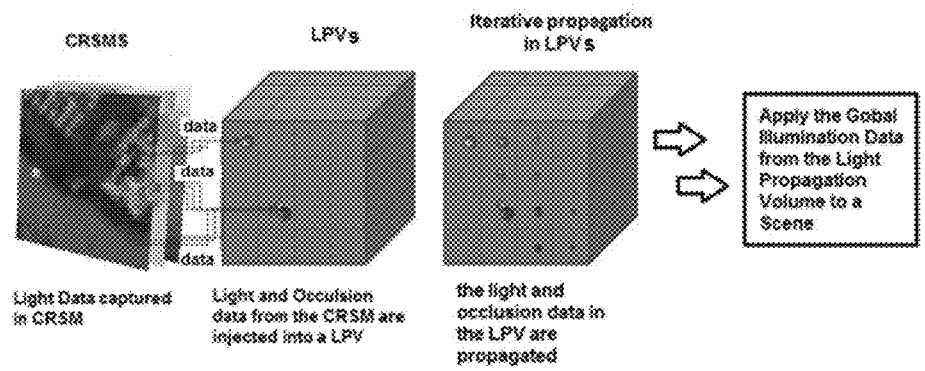
FIG. 7 demonstrates a process to generate illumination effects by the dynamic global illumination system of the disclosure, wherein left panel, light data or flux is captured in a CRSM; middle panel, light and occlusion data from the CRSM are injected into a LPV; and right panel, the light and occlusion data in the LPV are propagated. The drop-shaped blue, green and red objects represent directional distribution and relative light intensity for three color channels.

To inject the flux or light data now stored in the Cube Reflective Shadow Maps in the Light Propagation volume 550, it needs to be injected first and then later it needs to be propagated in this volume 600. In a particular embodiment, the DGI system of the disclosure injects the data from the cube reflective shadow maps into the VPL by first calculating the spherical harmonics ("SH") basis of the reflected flux and then compressing the calculated data as two SH bands into the VPL. The two bands of spherical harmonics require four coefficients, so four coefficients are needed for each of the red, green, and blue color channels, such that the two bands are stored in 3 volume textures for red, green and blue color channels (see e.g., FIG. 7).

Figure 8:
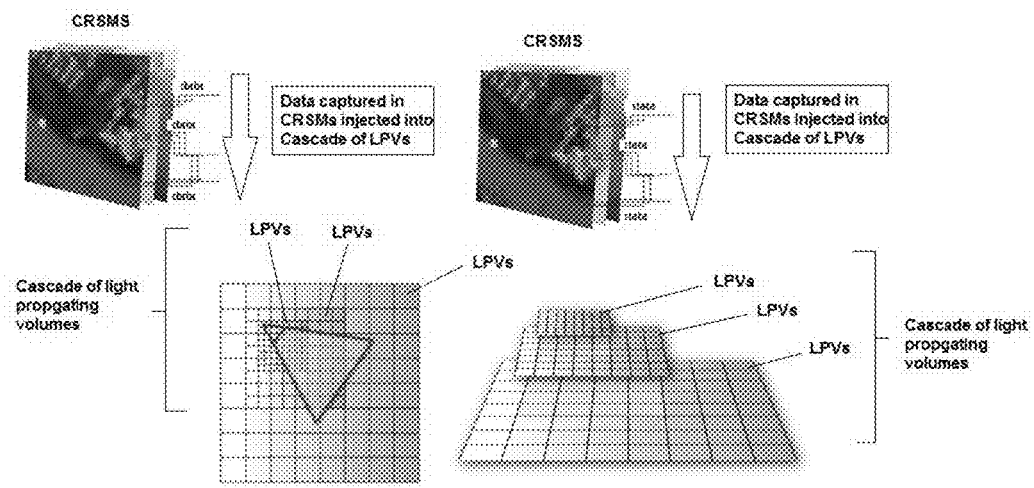
FIG. 8 demonstrates a process to generate illumination effects by the dynamic global illumination system of the disclosure, wherein instead of a single LPV, a cascade of two or more LPVs are injected with light data or flux captured in a CRSM or in Cascaded Shadow Maps.

In another embodiment, the DGI system of the disclosure injects the data from the cube reflective shadow maps into a cascade of at least two, three, four, or five LPVs. The LPV cascade are in front of the main camera and track with the camera (see e.g., FIG. 8). All of the cascaded LPVs cover the camera position and LPVs with bigger volumes contain the smaller ones. In a particular embodiment, for the DGI system of the disclosure when a grid cell location is being calculated, it is also binned into one of the cascaded LPVs, so that the data is not replicated across separate cascades.

In another embodiment, the disclosure provides for extended LPVs that utilize data structures based upon non-uniform rather than uniform grids. In particular, the disclosure provides for LPV light propagation volumes based upon octree data structures. LPVs utilizing octree data structures extend the traditional 3D array approach to non-uniform structures. While an LPV octree based approach is presented herein, it should be also understood that additional data structures can be utilized. The algorithms of these data structures would largely overlap and be implemented in the similar manner as the LPV octree approach disclosed herein. By utilizing an LPV octree approach, the LPV cells that form the 3D SH volume are independently assigned a size as well as a volume dimension. Accordingly, rather than having an array of equal sized cells, an array of cells which differ by volume/size is generated.

An Octree is a tree data structure that provides for the structuring of neighbor access using a multi-resolution cell approach, as opposed to cell by cell approach. Octrees partition a three dimensional space by either assigning a leaf with as much SH information as desired or by recursively subdividing it into eight spatial octants. Accordingly, the LPV octree approach of the disclosure recursively divides the space down to a max resolution determined by the programmer, with each level down the tree providing more resolution in that local area. Because the recursion decision is local to the current node, the lighting resolution adapts to the physical makeup of the area being lit.

The LPV octree approach disclosed herein obviates the most common problem associated with traditional LPV array approaches of being able to find/generate the correct resolution. For example, empty space with low frequency light data can be assigned to several large octree nodes, while a detailed portion of the same space can be assigned to utilize many children, each one lighting a smaller area so as to generate a highly detailed lighting effect.

To create an octree many approaches maybe utilized, including the use of a GPU friendly approach where a full voxel array is first built on the GPU and then a similarity volume is built. This approach allows for recursion from the full voxel resolution down to a (1×1×1), with each level having an entry saying if the (2×2×2) block at its position in the higher level (or full voxel map at the highest level) are the same or similar enough to be considered the same. Once this voxel array is built, the similarity volume to create cells at each node is built, if the entry for the cell in the similarity volume is true (it's similar enough) then a recursion for that cell is not performed.

Lighting the propagation volume without an octree is a simple operation; one simply utilizes the resolution value of the neighboring cells, as each cell is at the same resolution, and the SH values can be used. The lighting phase for an LPV octree, by contrast utilizes a full explicit octree with nodes that aren't used are marked as such, so that calculating the address where a cell resides is simple but further must take into account multiple states of SH validness. This approach works in some cases, where the initial pre-propagation light field is at approximately at the same resolution as the post-propagation field, but where this isn't true, a subdividing algorithm that modifies the octree at each propagation step can be utilized. The subdividing algorithm accounts for increased resolution of the light which has moved during the propagation step. These algorithms can therefore achieve the same lighting quality or be of higher quality than the array based LPV, by allowing light to bounce into previously unlit areas. There are many variants possible and optimizations can also be made to improve the basic operation of these algorithms. In particular, a Reciprocal Energy Transfer can be implemented, where when transferring energy into a neighbor, we also transfer the energy back to the starting cell. This would reduce the amount of octree walking roughly by half. As an example an octree process would look like:

PSEUDO CODE of non subdividing operation
For each leaf node in Octree BEGIN
   Calculate address of neighbour node
   Let neighbour be node data from tree neighbour
   Switch on neighbour.state (3 states possible)
   1) No Children Nodes: This is the same resolution.
     Do PropogateLPV(our cell, neighbour)
   2) Has Children: Our neighbour is higher resolution than us.
     Do PropogateHiresToLoresLPV(our cell, neighbour)
   3) Is Invalid: Our neighbour is low resolution than us.
     Do PropogateLoresToHires(our cell, neighbour)
END
PropogateLPV(_cell0 _cell1) BEGIN
   Propogate _cell0 to _cell1
END
PropogateHiresToLoresLPV(_cell0 _cell1) BEGIN
This splits the energy in our large spatial node equally into each leaf children of our neighbour
   Let ChildrenList be a list of children cells of _cell1 that are leaf cells
   Let NumChildren be the size of the list ChildrenList
   For each ChildCell in ChildrenList
   PropogateLPV(_cell0 SH/NumChildren, ChildCell)
END
PropogateLoresToHiresLPV(_cell0 _cell1) BEGIN
Walk up tree starting from neighbours 'invalid' node until a valid cell is found
   While _cell1 is Invalid BEGIN
     Let cell1=parent of _cell1
   END
   PropogateLPV(_cell0, _cell1)
END Similar to LPVs, the disclosure also provides for DGI system disclosed herein comprising geometry volumes ("GV") which are volumetric grid structures used to represent occlusion data in the scene, wherein in a certain embodiment, each grid cell contains a set of four spherical harmonic coefficients which describe the influence on occlusion at that location. In a certain embodiment, GVs of the disclosure are offset by half a cell's length in every direction so each of the grid cell's in the GV lie on the corners of the grid cells in the LPV. In a further embodiment, for a DGI system disclosed herein, when light is propagated in the LPV the occlusion data will come from the GV grid cells that lay between the cells in the LPV that light is propagating through, wherein in a manner very similar to the light data injection into the LPV, the grid cell location is found using the world space position reconstructed from the depth value in the CRSM. In yet a further embodiment, for a DGI system disclosed herein, the normal spherical harmonic coefficients are calculated to represent the influence geometry has on occlusion, and then these coefficients are stored in the GV.

Figure 9:
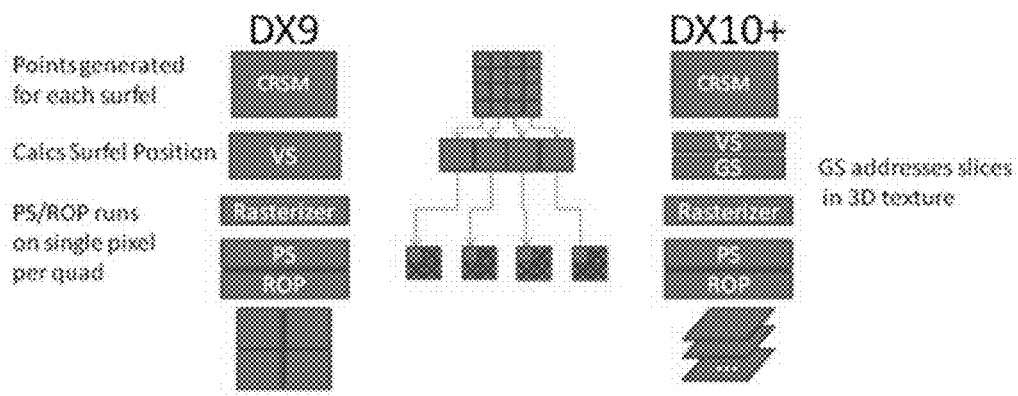
FIG. 9 demonstrates a graphical application programming interface ("API") view of how light data or flux are injected into LPVs using either DirectX® 9 ("DX9") or DirectX® 10 and later version ("DX10+") on Microsoft® based platforms. "VS" represents the Vertex Shader, which is used to calculate the surfel position in the LPV; "GS" represents the Geometry Shader, which is used in combination with VS to calculate the surfel position in the LPV; "PS" represents the Pixel shader, also known as fragment shaders, which compute color and other attributes of each pixel; and "ROP" represents the Raster Operation that writes fragments into the frame-buffer of a hardware unit.

An example of a standard implementation of light and occlusion injection at the hardware level is presented in FIG. 9. For every future surfel in the CRSM, a point is generated and then later stored in the CRSM. With DirectX® 9 the vertex shader is used to calculate the surfel position in the LPV. With DirectX® 10 and higher, the Vertex and Geometry shader are used to do this calculation. Since point primitives are used in the graphics pipeline, only a single pixel from every hardware quad is used in the Pixel Shader and ROP hardware units. With DirectX® 9 the LPV is unwrapped on a 2D texture. With DirectX® 10 and higher, the LPV is represented as a 3D texture. The geometry shader is used to address the right slices in the LPV with DirectX® 10 and higher. With this implementation, ROP access is not coherent, which means the performance is only probably less than 25% of what the hardware can provide with regular rendering.

In a certain embodiment, the disclosure provides for a DGI system where substantially all calculations are done in the vertex shader, whereby the pixel shader is used to pass the data to the ROP unit only. The disclosure therefore provides for a DGI system which is coherent and efficient in regular rendering than current hardware implementation methods.

In order to reduce flickering the following approach can be used: 2 copies of low-resolution CRSMs are generated for the VPL data. An old copy and a current copy. Each time the data from the cube reflective shadow maps are injected into the LPV, both copies of the Low-resolution CRSMs are injected (old copy with the (1-dt) coefficient and a new one with the dt coefficient), effectively using a linear interpolation between the two CRSMs. This method of reducing flickering is faster than known methods of injecting a single high-resolution CRSM, and also delivers a smoother result. Copies of CRSMs can be reused across several frames due to interpolation reducing the need to re-generate high-resolution CRSM each frame. In a particular embodiment, a DGI system of the disclosure use the following method to reduce flickering: generating two copies, and old and new copy, of low resolution CRSMs for the VPL data; injecting the two copies of the low resolution CRSMs into the LPV, wherein old copy has a (1-dt) coefficient and the new copy has a dt coefficient, so that the two copies of the low resolution CRSMs in the LPV can be interpolated. In a further embodiment, for a DGI system of the disclosure, the method to reduce flicking can reuse the copies of low resolution cRSMs across several frames.

In a certain embodiment, a DGI system of the disclosure comprises extensions that improve the illumination effect for multiple bounces of VPL data, wherein each indirect light bounce is stored in a separate LPV so that two or more sets of 3 volume textures are used per two or more bounces of a light source.

Figure 10:
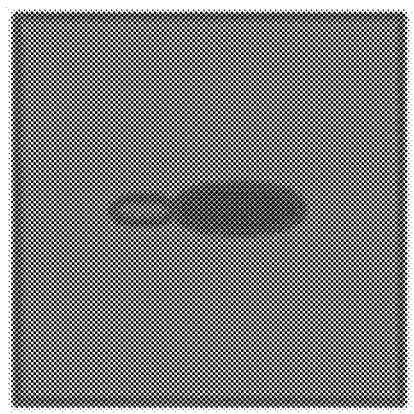
FIG. 10 shows an injected light image or flux in a LPV cell prior to being propagated.

After the flux is injected into the Light Propagation Volume, the flux is distributed with spatial discretization the Light Propagation Volume or, in other words, propagated in the Light Propagation Volume. An image of a light flux in the VPL prior to propagation is presented in FIG. 10.

The flux distribution is approximated by the spherical harmonic cosine lobe representation that is centered on the Normal for a given texel in the CRSM. The coefficients are scaled according to how the VPL are reflected from a surface. If the VPL points away from that cell's center, then its contribution is not added to the cell but to one or more neighboring cells, in order to avoid self-lighting and shadowing. For this, each VPL is virtually moved by half the cell spacing in the direction of its normal, before determining the cell. In the LPV cell, the orientation of the VPL is only taken into consideration, i.e. the exact positioning inside that cell is ignored. In a particular embodiment, a DGI system disclosed herein propagates the flux in light propagation volume using methods disclosed in Kaplanyan et al., "Diffuse Global Illumination with Temporally Coherent Light Propagation Volumes", GPU Pro 2, AK Peters 2011 (incorporated herein by reference).

Then flux is then propagated to the six neighbor cells along the axial directions during each propagation iteration. Subsequent propagation iterations take into account the LPV resulting from the last propagation step.

Figure 11:
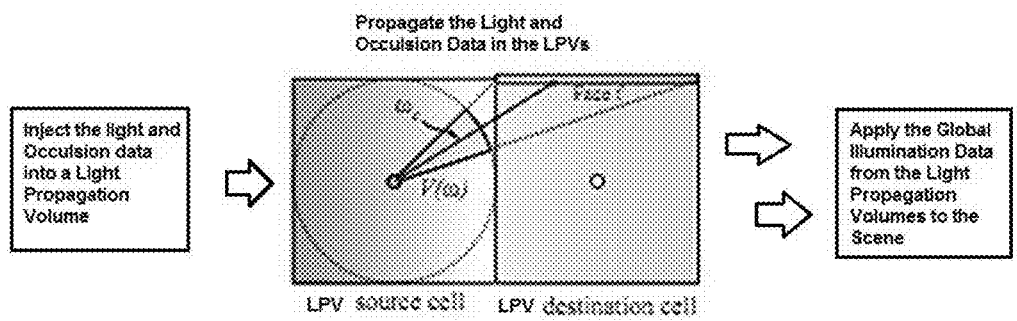
FIG. 11 provides a method of the disclosure to propagate the light image to neighboring cells by converging the flux with $1^{st}$ order spherical harmonic approximation of the face visibility function, resulting in a scalar that modulates the same face visibility approximation.

A common way to propagate the flux is to propagate to the neighbor cells by converging (integrated over the sphere) the flux flow with the $1^{st}$ order SH approximation of the face visibility function. The result is a scalar which modulates the same face visibility approximation (see e.g., FIG. 11).

The disclosure provides for a DGI system of the disclosure to propagate flux in a LPV to neighboring cells by using at least 1, 2, 3, 4, 5, or 6 virtual directions. In a particular embodiment, a DGI system of the disclosure propagates flux in LPV to neighboring cells by using one virtual direction.

Figure 12:
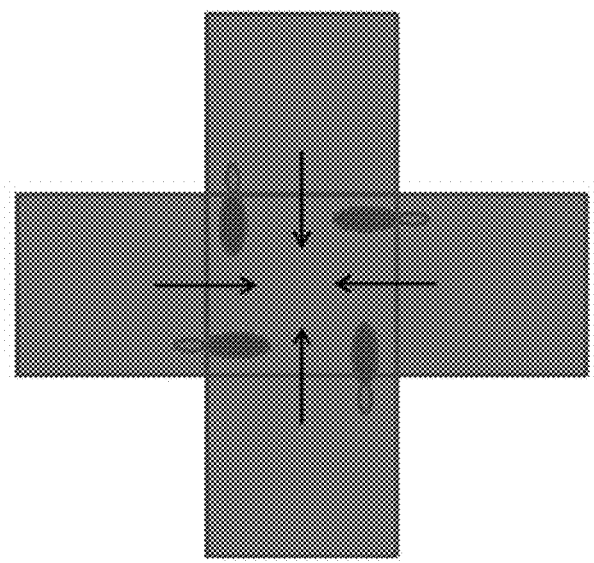
FIG. 12 demonstrates a method of the disclosure to gather light propagation from neighboring cells by propagating the flux from the neighbor cells to a given cell.

Since scattered writes are either not available (DirectX® 10) or not efficient enough (DirectX® 11, requires atomics and UAV), the disclosure provides for a DGI system which uses gathering instead. In other words, a DGI system of the disclosure propagates the flux in the LPV from the neighbors of a given cell instead of propagating the flux in the LPV from a given cell to its neighbors (see e.g., FIG. 12).

During each flux propagation step, the GV is sampled for cells that lie between the LPV cells that light is propagating through. Spherical harmonic coefficients are evaluated from the GV and result in an occlusion term which influences the value for light propagation in the LPV.

Before a sample is added to the diffuse component, the Geometry Volumes are sampled with a one cell offset in direction of propagation to check for occlusion geometry that could reflect the light in a similar way as the diffuse component.

By modifying the discretization used in each propagation iteration, the DGI system of the disclosure renders a much higher quality illumination effect in electronic visual media than other methods known in the art. Moreover, instead of propagating flux in the LPV from six neighboring cells to the center destination cell, propagation in the LPV may occur from the 26 immediately adjacent neighboring cells that either share a face, edge, and/or corner. This increased number of propagation directions also allows Light Propagation Volumes to take advantage of an extra order of spherical harmonics, meaning the use of band 0, 1, and 2 spherical harmonics for a total of 9 coefficients per color channel.

To apply the final lighting, each position is reconstructed for each pixel on the screen; and these positions are indexed into the LPV so as to generate tri-linearly interpolated spherical harmonic coefficients C. The tri-linear interpolation of spatially approximated radiance may cause artifacts such as self-illumination and light bleeding. To alleviate this problem, a dampening factor is calculated by comparing light propagation directions. The directional derivative of spherical harmonic coefficients ∇C in the direction of the surface normal is compared with the spherical harmonic coefficients C that will light the pixel. The dampening factor depends on the magnitude of the derivative and whether ∇C and C are contra-directional. The disclosure provides for a DGI system disclosed herein to apply global illumination data from the Light propagation volume to the Scene using methods disclosed in Kaplanyan et al., "Diffuse Global Illumination with Temporally Coherent Light Propagation Volumes", GPU Pro 2, AK Peters 2011 (incorporated herein by reference).

In a particular embodiment, a DGI system of the disclosure comprises the gradient vector being projected on the light flow direction vector and smoothstep function the result, wherein the result of the smoothstep function is then used as dampening factor for applying the global illumination data from the Light Propagation Volume to the Scene.

Figure 13:
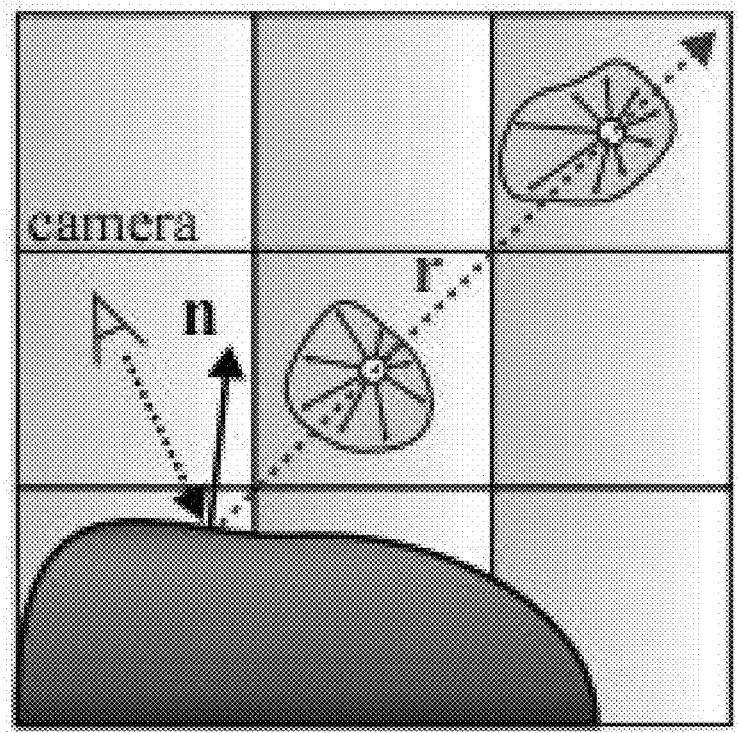
FIG. 13 demonstrates a method of the disclosure of ray marching the LPV to determine specular reflection.

Common methods to add a glossy specular reflection using the calculated LPVs is by ray marching through the LPV in the reflected direction and accumulate a specular light intensity (see, e.g., FIG. 13). In other words, tracing the source volume texture with regular steps towards a reflected direction. Then the integration can be applied over the cone with respect to the viewing angle. The level of glossiness depends on the initial cone angle of the outgoing reflected ray. In a particular embodiment, A DGI system of the disclosure can add a glossy specular reflection using the calculated LPVs is by ray marching through the LPV in the reflected direction and accumulate a specular light intensity. The DGI system of the disclosure, however, can also use a much simpler method to generate glossy specular refection. In a certain embodiment, a DGI system of the disclosure can add a glossy specular reflection to a scene comprising the method of fetching the value of the SH function for the r direction, wherein the specular coefficient is applied as a simple scalar multiplier. In further embodiment, a DGI system of the disclosure can add a Fresnel illumination effect using a similar method as is used to add a glossy specular reflection.

In general terms, embodiments of the disclosure provide a way of creating and applying a light reflection and defraction to a virtual surface including its color, shading, and specularity, in order to obtain high-quality final results with significantly less effort than what is provided by the prior art. The methods of the disclosure can be implemented by a computer (either locally or remotely). The computer system can comprise, for example, a server coupled to various end user devices over a data communications network such as, for example, a public Internet. The server includes one or more software modules for creating and applying the methods of the disclosure.

The server can be coupled to a mass storage device such as, for example, a disk drive or drive array, for storing information used by the server for creating and applying the methods of the disclosure and for callback of stored "static" image data. For example, the mass storage device may store reference images, captured material data, generated 3D models, and any other information needed for creating and applying the lighting methods of the disclosure.

According to one embodiment of the disclosure, the end user devices may connect to the data communications network using a telephone connection, satellite connection, cable connection, radio frequency communication, or any wired or wireless data communication mechanism known in the art. The users of the end user devices may connect to the server for downloading processed images. Once downloaded, the images may be displayed locally by one or more processors resident in the downloading end user device. The information stored in the server's mass storage device will also instead be stored locally in a data store coupled to the downloading end user device. According to another embodiment, computer readable and executable methods of the disclosure are provided in a computer readable media and delivered to a user of the end user device for installation.

In another embodiment, the methods of the disclosure are implemented in a computer executable format for local renderings and processing. In this embodiment, a local computer will includes the necessary processor and storage media for installation and execution of the computer readable file for processing images according to the methodology described herein.

In the computer implemented methods of the disclosure, the methods of the disclosure are implemented in a computer readable format and a computer readable medium such as, but not limited to, a flash-drive, optical drive, floppy or hard disk or a computer RAM/ROM. In specific embodiments, the methods of used to on gaming systems for rendering virtual images of scenes, characters and actions.

Thus, the invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A number of embodiments of the invention have been described. Nevertheless, it will be understood that various modifications may be made without departing from the spirit and scope of the invention. Accordingly, other embodiments are within the scope of the following claims.

What is claimed is:

1. A Dynamic Global Illumination ("DGI") method for rendering a scene to electronic visual media comprising:
    (A) capturing pixelated light data in cube reflective shadow maps ("CRSMs"), wherein each pixel in a CRSM is treated as a Virtual Point Light ("VPL") source, by storing depth, normal and flux data, and wherein a fall-off function is used to adjust the light data captured in the CRSMs;
    (B) injecting the light and occlusion data into one or more Light Propagation Volumes ("LPVs");
    (C) propagating the light and occlusion data in the one or more LPVs to obtain global illumination data;
    (D) applying the global illumination data from the one or more LPVs to a scene; and
    (E) outputting the scene to a display or electronic visual media, wherein the method is carried out using a rendering pipeline of a graphics processing unit (GPU);
    wherein for step (A) a CRSM size is picked dynamically based upon whether there is a dynamic object in the proximity of a light source, wherein a dynamic object that is near to a light source will be rendered into a higher resolution CRSM while if the dynamic object is far from the light source, then a lower resolution CRSM is used.

2. The DGI method of claim 1, wherein the CRSMs may be cached for those CRSMs that have no dynamic object in an area of influence of the light source.

3. The DGI method of claim 1, wherein for step (B), the light data from the CRSM is calculated as reflected flux and then compressed as two bands of the spherical harmonics basis and injected into a VPL, wherein the two bands of the spherical harmonics basis use four coefficients for each of red, blue and green color channels, so that three volume textures are stored for red, green, and blue color channels.

4. The DGI method of claim 1, wherein for step (B) a cascade of LPVs is used, and further comprises calculating a grid cell, wherein when a grid cell location is calculated it is binned into one of the cascaded LPVs so that data is not replicated across separate cascades.

5. The DGI method of claim 1, wherein for step (B) an LPV octree is implemented so as to partition a three dimensional space by either assigning a leaf node with as much SH information as desired or by recursively subdividing it into eight spatial octants.

6. The DGI method of claim 5, wherein a light propagation phase for the LPV octree utilizes a non-subdividing operation for each leaf node and/or a basic subdividing operation for the light propagation.

7. The DGI method of claim 1, wherein for step (B) the occlusion data are represented by volumetric grid structures in geometry volumes ("GVs"), wherein each grid cell contains a set of four spherical harmonic coefficients which describe the influence on occlusion at that location.

8. The DGI method of claim 7, wherein the GVs are offset by half a cell's length in every direction so each of the grid cells in the GV lie on the corners of the grid cells in the LPV, so that when propagating light in the LPV, the occlusion data will come from the GV grid cells that lie between the cells in the LPV that light is propagating through.

9. The DGI method of claim 1, wherein flickering can be reduced by:
   (A) capturing the light data as two CRSM copies, an old copy and a current copy; and
   (B) injecting the light data from both of the CRSM copies into the one or more LPVs, wherein the old copy has a 1-dt coefficient and the current copy has a dt coefficient, such that a linear interpolation between both CRSM copies is effectively used.

10. The DGI method of claim 1, wherein if a light makes two or more bounces then each bounce is injected into a separate LPV, so that there are two or more sets of 3 volume textures for two or more bounces.

11. The DGI method of claim 1, wherein for step (C) the light and occlusion data in the one or more LPVs is propagated in one virtual direction from at least six neighboring cells to a center destination cell.

12. The DGI method of claim 11, wherein the light and occlusion data in the one or more LPVs is propagated from twenty six immediately adjacent neighboring cells that share a face, edge and/or corner.

13. The DGI method of claim 11 or 12, wherein the light and occlusion data comprises red, green and blue color channels and up to a total of 9 coefficients per color channel can be used, which results from an extra order of spherical harmonics ("SH").

14. The DGI method of claim 1, wherein prior to step (D) a dampening factor is used to eliminate artifacts prior to applying the light to the scene comprising:
   projecting a gradient vector on a light flow direction vector; and
   applying a smoothstep function to the results of the projection to generate the dampening factor.

15. The DGI method of claim 1, wherein a glossy specular reflection can be applied to the scene by fetching a value of a SH function for a r direction, so that the specular coefficient is applied as a simple scalar multiplier.

16. The DGI method of claim 1, wherein calculations are performed using a vertex shader and a geometry shader, mainly the vertex shader; and wherein a pixel shader is only used to pass the global illumination data to a raster operations pipeline of a graphics processing unit that outputs the scene to electronic visual media using a frame buffer.

17. The DGI method of claim 1, wherein the fall-off function is smoothstep function, which utilizes Hermite interpolation to step between two values.

18. A non-transitory computer readable medium containing program instructions for providing dynamic global illumination effects in electronic visual media, wherein execution of the program instructions by one or more processors of a computer system causes the one or more processors to carry out the steps of:
   (A) capturing light data in cube reflective shadow maps ("CRSMs"), wherein a fall-off function is used to adjust the light data captured in the CRSMs;
   (B) injecting the light and occlusion data into one or more Light Propagation Volumes ("LPVs");
   (C) propagating the light and occlusion data in the one or more LPVs to obtain global illumination data; and
   (D) applying the global illumination data from the one or more LPVs to a scene;
   wherein for step (A) a CRSM size is picked dynamically based upon whether there is a dynamic object in the proximity of a light source, wherein a dynamic object that is near to a light source will be rendered into a higher resolution CRSM while if the dynamic object is far from the light source, then a lower resolution CRSM is used.

19. A Dynamic Global Illumination ("DGI") method for rendering a scene to electronic visual media comprising:
   (A) capturing pixelated light data as an old copy and a current copy in cube reflective shadow maps ("CRSMs"), wherein each pixel in a CRSM is treated as a Virtual Point Light ("VPL") source, by storing depth, normal and flux data, wherein a fall-off function is used to adjust the light data captured in the CRSMs;
   (B) injecting the light and occlusion data from the old copy and the current copy into one or more Light Propagation Volumes ("LPVs"), wherein the old copy has a 1-dt coefficient and the current copy has a dt coefficient, such that a linear interpoloation between both CRSM copies is used;
   (C) propagating the light and occlusion data in the one or more LPVs in one virtual direction from at least six immediately adjacent neighboring cells that share a face, edge and/or corner to a center destination cell to obtain global illumination data;
   (D) applying the global illumination data from the one or more LPVs to a scene; and
   (E) outputting the scene to a display or electronic visual media, wherein the method is carried out using a rendering pipeline of a graphics processing unit (GPU); and
   wherein for step (A) a CRSM size is picked dynamically based upon whether there is a dynamic object in the proximity of a light source, wherein a dynamic object that is near to a light source will be rendered into a higher resolution CRSM while if the dynamic object is far from the light source, then a lower resolution CRSM is used.

* * * * *